UNITED STATES PATENT OFFICE.

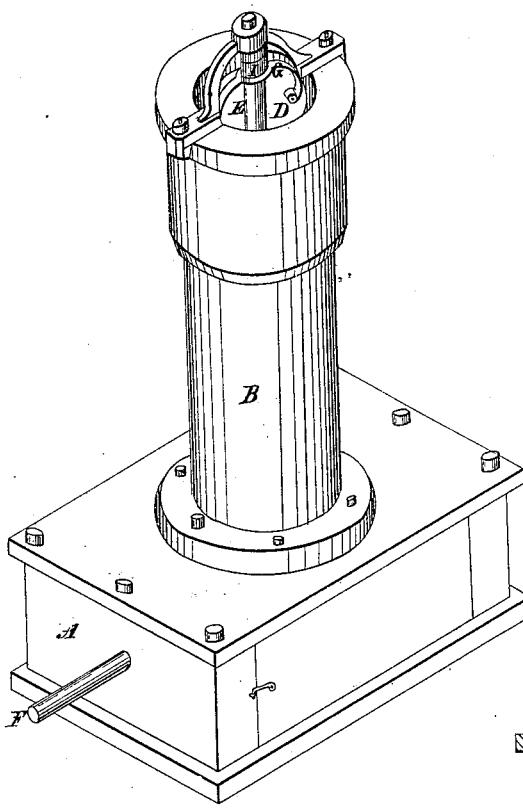

A. C. VANBEBBER, A. SALLEE, AND J. BRITTON, OF FULTON, ILLINOIS.

IMPROVEMENT IN BALANCED SLIDE-VALVES.

Specification forming part of Letters Patent No. 53,708, dated April 3, 1866.

*To all whom it may concern:*

Be it known that we, A. C. VANBEBBER, A. SALLEE, and JAMES BRITTON, of Fulton, county of Whiteside, State of Illinois, have invented a new and useful Machine for Relieving the Pressure and Friction of Valves for Steam-Engines; and we do hereby declare that the following is a full and clear description of the construction and operation of the same, reference being had to the annexed drawings, making a part of this specification, in which—

Figure 1 is a perspective view; Fig. 2, a longitudinal section; Fig. 3, a transverse section.

To enable others skilled in the art to make and use our invention, we will proceed to describe its construction and operation.

We construct the steam-chest and introduce steam into it in the ordinary manner. We then construct a cylinder, B, and fasten it to the cap of steam-chest A with bolts.

In the top of cylinder B we place a piston-head, D D and P, which may be packed steam-tight with metallic rings or hemp. We connect piston-head D D and P to valve C in steam-chest A with rod E.

We further place on the top of cylinder B a guide, H, which serves as a guide to rod E, and also prevents the head D D and P from blowing out should bolts in rod E become detached.

We also place a spring, G, under guide H, resting on piston-head D, which is regulated with nuts at I'. This is to counteract the friction of piston D D and P, and, further, it prevents the lifting the valve C from its seat.

O is a guide for rod E to pass through.

It is obvious that when steam is introduced into the steam-chest the pressure will be the same per square inch upon the head D D and P as upon valve C, consequently relieving the pressure and friction on valve C, thereby saving power and preventing wear of valve-seat.

What we claim as our invention, and desire to secure by Letters Patent, is—

1. The combination, with a steam-engine valve, C, of the suspension-rod E, balancing-piston D D P, and guide O, all constructed and arranged to operate as and for the purposes specified.

2. The combination of the spring G and temper-screw I, as and for the purposes specified.

3. The guide H, projecting inward over the edge of the piston D, to act as a guard to prevent the blowing out of the piston, in the manner described.

Dated at Fulton, Illinois, this 10th day of March, A. D. 1866.

A. C. VANBEBBER.
    A. SALLEE.
    J. B. BRITTON.

In presence of—
 W. G. SNYDER,
 ALEXANDER WALLACE.